March 10, 1936.  J. G. WILSON  2,033,798
QUARRY CAR
Filed March 21, 1933  3 Sheets-Sheet 3

Inventor:—
John G. Wilson
by his Attorneys
Howson & Howson

Patented Mar. 10, 1936

2,033,798

UNITED STATES PATENT OFFICE 2,033,798

QUARRY CAR

John G. Wilson, Paoli, Pa.

Application March 21, 1933, Serial No. 661,954

7 Claims. (Cl. 105—264)

This invention relates to industrial cars, and more particularly to a body and truck frame construction particularly adapted for use in conjunction with quarry cars.

Quarry cars are subjected to unusual rigors and as a result are ordinarily relatively short-lived. The cars are subjected to heavy impacts in coupling and uncoupling the same from the tractor and due to the heavy loads contained in the bodies have a tendency to rack so that they break their supports in a relatively short time. They are, furthermore, difficult to manipulate in dumping, it being understood that quarry cars, to be successful, must be of the dumping type. The cars are ordinarily supported from pivots at their ends which, due to the heavy loads imposed thereon, and unwieldy nature of their contents, are usually disposed well above the bottoms of the car. Locking mechanisms associated with the pivots must, therefore, be duplicated at opposite ends of the car, necessitating in dumping that the workmen move from one to the other end of the car and thus consume considerable time. This has lead to fairly common use of what is ordinarily known as a chain fastener consisting of a pair of chains connected to the body at opposite sides thereof and to the frame so that movement of the car in either direction is ordinarily restrained. Such devices are, however, extremely unsatisfactory in that any chain connection must, of necessity, be left sufficiently loose to permit its disengagement, thus permitting play. The load, usually of at least several tons in weight, is often unbalanced with the result that the car tends to lean to one side, the chain on the other side tightening in the process. If, due to inertia resulting from movement of the car about a curve, the load tends to move toward the side at which the chain is tight, the body may partake of considerable movement and the inertia thus set up tends to upset the car and cause it to leave the rails, often carrying with it a succeeding car or cars and causing considerable delay in the movements of the train.

An important object of the present invention is the provision of a centrally-disposed locking mechanism for such cars, of such character that the car body is held substantially rigid with relation to the car truck so that the inertia forces hereinbefore mentioned may not be set up and cause tipping of the car.

A further object of the invention is to provide in combination with such a locking mechanism a means rigidifying the car body to the truck frame in a direction longitudinal to the car when in its normal or load-carrying position so that during coupling and uncoupling movements there is no rocking of the car supports upon which the end pivots are mounted.

Such cars are generally of the self-righting type and a further object of the invention is the provision of a restraining device in combination with a rocker support for the car, which restraining device is of such character that the car is prevented from moving too far in its dumping action.

These and other objects I attain by the construction shown in the accompanying drawings wherein, for the purpose of illustration, I have shown a preferred embodiment of my invention and wherein.

Figure 1:
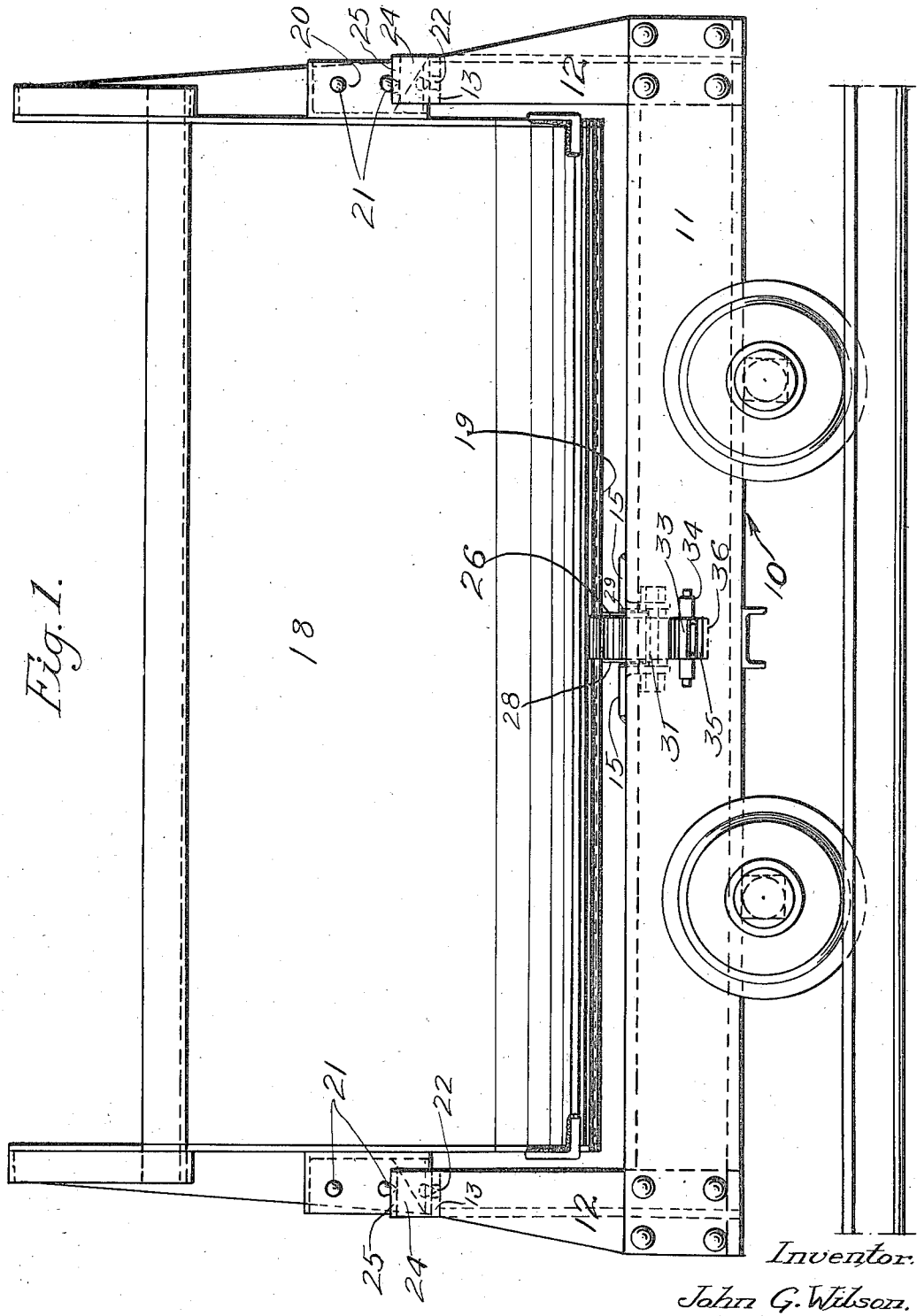
Fig. 1 is a side elevation of a quarry car constructed in accordance with my invention.
Figure 2:
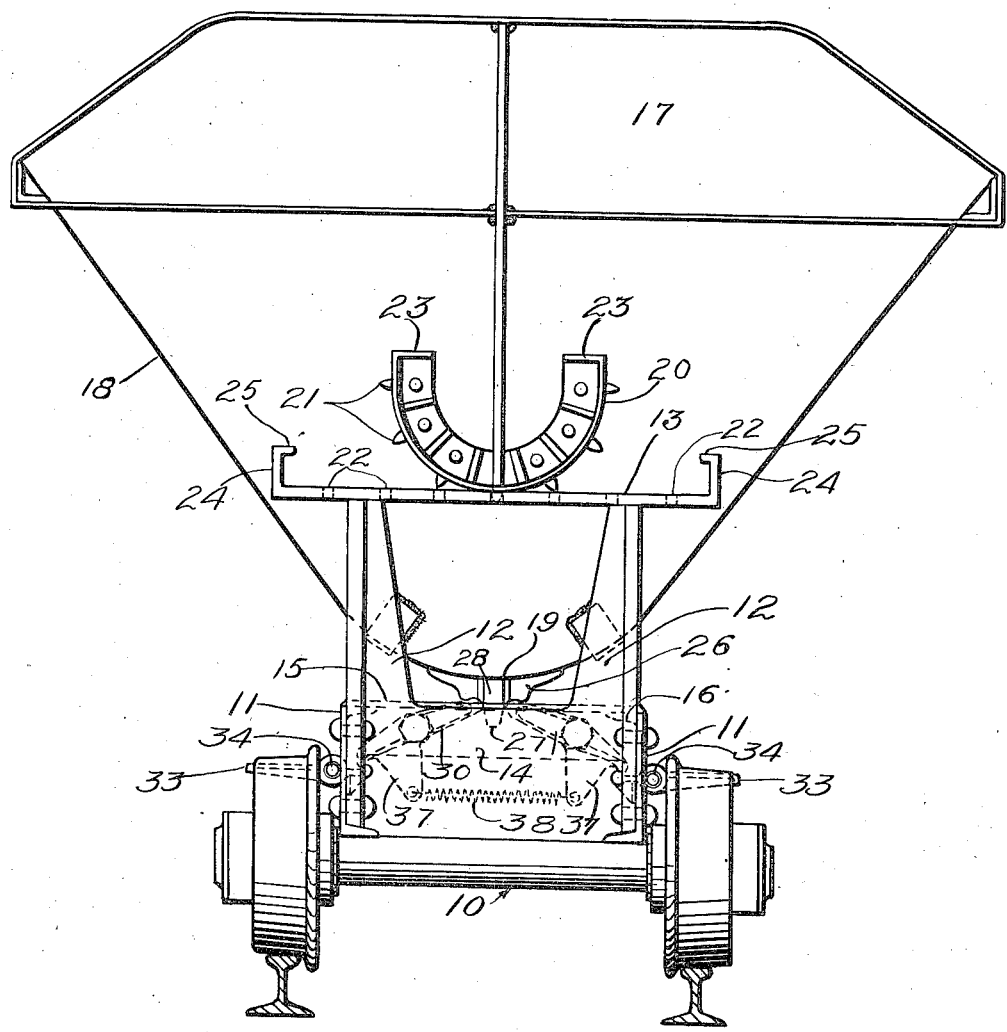
Fig. 2 is an end elevation thereof.
Figure 3:
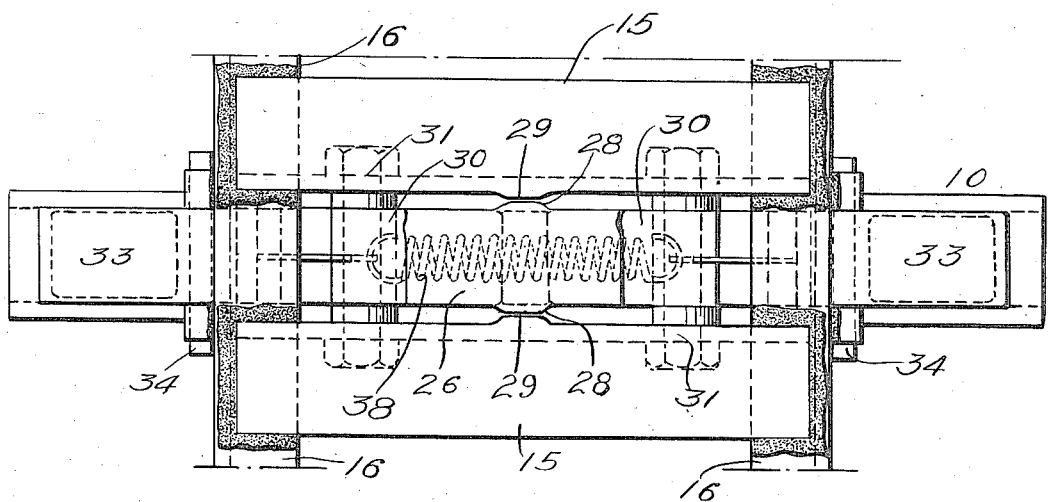
Fig. 3 is an enlarged horizontal transverse sectional view.
Figure 4:
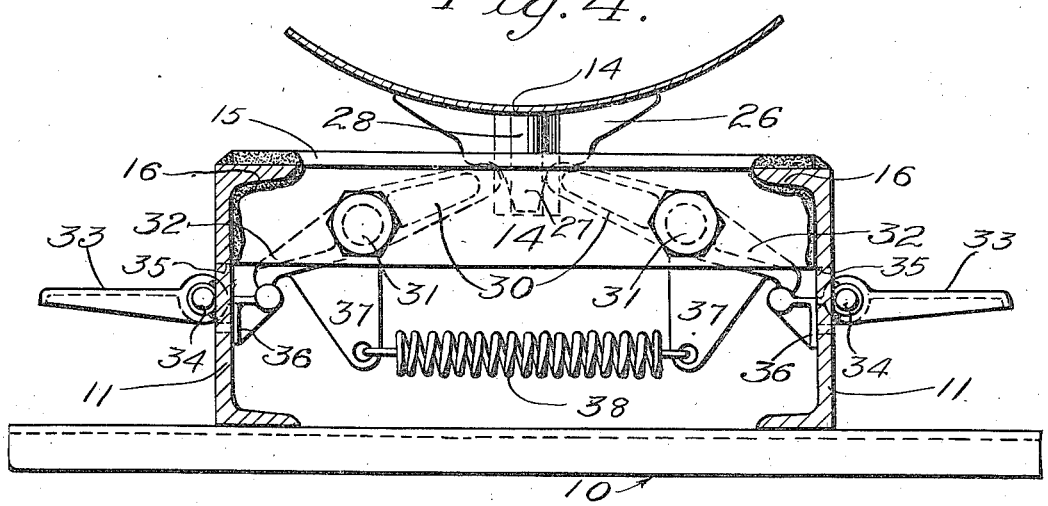
Fig. 4 is an enlarged transverse sectional view.

Referring now more particularly to the drawings, the numeral 10 generally designates a wheel-supported truck frame, at present shown as including longitudinal members 11 connected at their ends by standards 12, the upper ends of which support rocker platforms 13. These longitudinal members are further connected at the approximate centers thereof by a pair of spaced, parallel, transversely-extending supports comprising angle plates having the vertical angles 14 thereof opposed and the horizontal flanges 15 thereof seated upon and welded or otherwise secured to the upper flanges 16 of the longitudinal members.

The car is, in its general construction, of the usual type, including parallel end walls 17 and downwardly converging side walls 18 merging in a rounded bottom 19. The end walls 17 have each secured thereto at points spaced above the bottom thereof rockers 20, the faces of which are provided with cogs 21 to engage in openings 22 formed in the rocker beds. The rockers 20 are so disposed and designed that the car when empty has its center of gravity at a point lying between the rocker and the bottom 19 so that the car will, when emptied, tend to return automatically to its normal or load-receiving position. When loaded, however, the center of gravity is elevated due to the upwardly increasing cross sectional area of the car so that when loaded it has a tendency to tilt to one side or the other when released, as hereinafter described.

In order that the inertia of the car when dumping may not carry the car from the rocker platform, the ends of the rockers 20 are provided with flanges 23 while the ends of the rocker platform are provided with upstanding flanges 24 having inturned upper ends 25. The terminals of the inturned upper ends 25 are so spaced from the rocker center that the flanges 23 just clear the same as the car reaches the limit of its rocking. The terminal of the rocker proper will then act as a pivot upon which the car and the rocker will elevate, this elevation bringing the flange 23 and the rocker under the inturned terminal 25 and positively limiting this movement. The body is preferably, although not necessarily, of welded construction throughout.

To the bottom 19 I secure a member 26 having a centrally-arranged depending lug 27. This lug, during the time the car is in its normal position, or disposed at a slight angle to its normal position, extends between the vertical flanges 14 of the transverse braces and the side faces of the member and the confronting faces of the flanges 14 have cam lugs 28 and 29 formed thereon, the peaks of these lugs being flat while the side faces thereof are inclined. The peaks of the lugs 28 and 29 when the car body is in normal position, are opposed to one another and are but very slightly spaced, with the result that when the car body is loaded and a train or tractor is coupled thereto the impact resulting from coupling is transmitted directly from the truck frame 10 to the body through the member 26. A solid connection is thus provided, preventing any undue strain being placed upon the standards 12.

As a means for maintaining the car in its normal position, I provide a pair of dogs 30 mounted upon pivots 31 extending between the flanges 14 of the central transverse braces. These dogs each have a tail 32 overlying the inner end of a lever 33 which are pivoted upon the exteriors of the longitudinal members 11 as at 34 and extend through openings 35 formed therein. The inner end of each lever 33 has a downwardly-extending shoulder 36 which engages against the inner face of the corresponding side member to limit the downward movement of such inner end. Each dog 30 has upon the outer end thereof a downwardly-extending arm 37, these arms being connected by springs 38. The inner ends of the dogs are thus constantly urged upwardly to engage against opposite sides of the lug 27. It will be obvious that by depressing the outer end of a lever 33 which is in the form of a treadle the outer end of the corresponding dog will be elevated, thus depressing the inner end thereof and freeing the lug for movement in the direction of the depressed lever 33. Should a loaded car thus released be slightly unbalanced so that it tends to remain in engagement with the other of the dogs it may be unseated from this dog by a slight push. The treadle of lever 33 may be immediately released after movement of the car is started so that the lever assumes its normal position. When dumping of the car has been completed, the car will return by gravity to its normal position and in so doing the lug 27 will engage against the dog 30 and depress the same against the action of spring 38 to permit the lug to reach its normal position, after which the spring will act to return the dog to its normal position and secure the car with the lug centrally disposed and with its cam lugs 29 in opposition to the lugs 28 of the transverse braces.

While I have above described the dumping body and its supporting frame as a portion of a railway car, it will, of course, be understood that the use of the structure herein described is not necessarily limited to the specific arrangement illustrated and that the frame 11 might be mounted upon any vehicle.

It will also be obvious that the construction illustrated is capable of a certain range of change and modification, I accordingly do not wish to be understood as limiting myself thereto except as hereinafter claimed.

I claim:

1. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position, co-acting cams carried by said transverse elements and the end faces of said member, said cams having peaks, the peaks of the cams of the transverse elements and the member being in opposition when the body is in load-receiving position, and locking means co-acting with said member for maintaining the body in load-receiving position.

2. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position, co-acting cams carried by said transverse elements and the end faces of said member, said cams having peaks, the peaks of the cams of the transverse elements and the member being in opposition when the body is in load-receiving position, and a locking mechanism disposed at each side of the truck and having engagement with the corresponding side of the member, said locking mechanisms maintaining the member in its load-receiving position.

3. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position, co-acting cams carried by said transverse elements and the end faces of said member, said cams having peaks, the peaks of the cams of the transverse elements and the member being in opposition when the body is in load-receiving position, and a locking mechanism disposed at each side of the truck and having engagement with the corresponding side of the member, said locking mechanisms maintaining the member in its load-receiving position, and each when released permitting movement of the upper end of the body toward the opposite side of the truck.

4. In a quarry car, a wheel-supported truck, a body supported at its ends from the truck for transverse oscillation and normally assuming a vertical load-receiving position by gravity, the truck including spaced transversely extending elements, a member on the body interposing between said transverse elements when in load-receiving position and having portions which when in load-receiving position closely approximate opposing portions carried by said transversely-extending elements, a pair of dogs carried by the elements and adapted for co-action with opposite sides of said member to hold the body in its load-receiving position, each dog having a tail, and a single spring connecting the tails of said dogs.

5. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position and having portions which when in load-receiving position closely approximate opposing portions carried by said transversely-extending elements, a pair of dogs carried by the elements and adapted for co-action with opposite sides of said member to hold the body in its load-receiving position, and a treadle for releasing each dog, the treadle associated with each dog being disposed at the same side of the truck thereas and intermediate the ends of the body.

6. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position and having portions which when in load-receiving position closely approximate opposing portions carried by said transversely-extending elements, a pair of dogs carried by the elements and adapted for co-action with opposite sides of said member to hold the body in its load-receiving position, pivotal supports for said dogs carried by said transverse elements, each dog having a tail, and a single spring connecting the tails of said dogs.

7. In a quarry car, a wheel-supported truck, a body supported at its ends from the truck for transverse oscillation and normally assuming a vertical load-receiving position by gravity, the truck including spaced transversely-extending elements, a member on the body interposing between said transverse elements when in load-receiving position, a pair of dogs carried by the frame and adapted for co-action with opposite sides of said member to hold the body in its load-receiving position, pivotal supports for said dogs carried by said transverse elements, and a treadle for releasing each dog, the treadle associated with each dog being disposed at the same side of the truck thereas and intermediate the ends of the body.

JOHN G. WILSON.